(12) United States Patent
Simma et al.

(10) Patent No.: US 7,895,146 B2
(45) Date of Patent: Feb. 22, 2011

(54) TIME MODULATED GENERATIVE PROBABILISTIC MODELS FOR AUTOMATED CAUSAL DISCOVERY THAT MONITORS TIMES OF PACKETS

(75) Inventors: Aleksandr Simma, El Cerrito, CA (US); Moises Goldszmidt, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 662 days.

(21) Appl. No.: 11/949,061

(22) Filed: Dec. 3, 2007

(65) Prior Publication Data

US 2009/0144034 A1 Jun. 4, 2009

(51) Int. Cl.
*G06F 17/00* (2006.01)
(52) U.S. Cl. .......................................... 706/47; 726/22
(58) Field of Classification Search .................. 706/20, 706/45–47, 62; 709/224; 370/241–255; 726/22–23
See application file for complete search history.

(56) References Cited

U.S. PATENT DOCUMENTS

| | | | |
|---|---|---|---|
| 6,578,043 B2 | 6/2003 | Nye | |
| 7,020,802 B2 | 3/2006 | Gross et al. | |
| 7,131,037 B1 | 10/2006 | LeFaive et al. | |
| 7,257,744 B2 | 8/2007 | Sabet et al. | |
| 7,633,939 B2* | 12/2009 | Curran-Gray et al. | 370/389 |
| 2002/0019870 A1* | 2/2002 | Chirashnya et al. | 709/224 |
| 2002/0116154 A1* | 8/2002 | Nowak et al. | 702/186 |
| 2005/0089131 A1* | 4/2005 | Howell et al. | 377/1 |
| 2006/0123278 A1 | 6/2006 | Dini et al. | |
| 2006/0164997 A1* | 7/2006 | Graepel et al. | 370/241 |
| 2007/0074076 A1 | 3/2007 | Imai et al. | |
| 2007/0088981 A1 | 4/2007 | Noble et al. | |
| 2007/0157315 A1* | 7/2007 | Moran | 726/23 |
| 2007/0185586 A1 | 8/2007 | Al-Attar et al. | |
| 2008/0259799 A1* | 10/2008 | van Beek | 370/235 |

OTHER PUBLICATIONS

Bahl, et al., "Discovering Dependencies for Network Management", Microsoft Research, Princeton, 2006.
Kant, et al., "Fault Localization and Self-Healing Mechanisms for FCS Networks", Date: Dec. 2002, University of Delaware, Dept. of Computer and Information Sciences, Newark, USA.
Steinder, et al., "End-to-end Service Failure Diagnosis Using Belief Networks", University of Delaware 2002.

* cited by examiner

*Primary Examiner*—David R Vincent

(57) ABSTRACT

Dependencies between different channels or different services in a client or server may be determined from the observation of the times of the incoming and outgoing of the packets constituting those channels or services. A probabilistic model may be used to formally characterize these dependencies. The probabilistic model may be used to list the dependencies between input packets and output packets of various channels or services, and may be used to establish the expected strength of the causal relationship between the different events surrounding those channels or services. Parameters of the probabilistic model may be either based on prior knowledge, or may be fit using statistical techniques based on observations about the times of the events of interest. Expected times of occurrence between events may be observed, and dependencies may be determined in accordance with the probabilistic model.

10 Claims, 6 Drawing Sheets

TIME MODULATED GENERATIVE PROBABILISTIC MODELS FOR AUTOMATED CAUSAL DISCOVERY THAT MONITORS TIMES OF PACKETS

BACKGROUND

In an enterprise network, dependencies between hosts, protocols, and network services are complex, typically undocumented, and rarely static. Even though network management and troubleshooting rely on this information, automated discovery and monitoring of these dependencies is difficult.

Shared network services enable functional richness and flexibility for distributed applications. As a result, apparently simple facilities, such as remote file sharing and email, rely on multiple network services ranging from directory functions to authentication. In a large-scale deployment, the modularity and component reuse of shared network services lead to a complex system that is difficult for a network operator or a user to fully understand. As well as rendering effective management problematic, the size and sophistication of networked systems often lead to security vulnerabilities, inefficient troubleshooting and anomaly detection, and user frustration.

Current debugging capabilities for deployed networked systems are unsatisfactory. Individual applications may provide the ability to understand their own behavior. Analysis tools use operating system logging mechanisms or intrusive instrumentation to explicitly track the causal paths of individual requests.

SUMMARY

Dependencies between different channels or different services in a client or server may be determined from the observation of the times of the incoming and outgoing of the packets constituting those channels or services. A probabilistic model may be used to formally characterize these dependencies. The probabilistic model may be used to list the dependencies between input packets and output packets of various channels or services, and may be used to establish the expected strength of the causal relationship between the different events surrounding those channels or services. Parameters of the probabilistic model may be either based on prior knowledge, or may be fit using statistical techniques based on observations about the times of the events of interest. Expected times of occurrence between events may be observed, and dependencies may be determined in accordance with the probabilistic model.

In an implementation, the timing characteristics of the input packets and the output packets of various channels or services in computers in a network may be monitored. The timing characteristics may be compared to those established by the probabilistic model in order to detect deviations and provide an indication or alert regarding possible abnormalities.

In an implementation, where input channels and output channels are typed as such, a relationship may be assumed between input/output where the output channel depends on events from disjunction (logical or) of the input channels. Further, the uncertainties due to noisy measurements and changes in workload in the machines as well as the events, could be captured by the use of a non-homogeneous Poisson model. Such a model, one per output channel, may be further augmented with a functional representation of the expected timing relationship (taking time as a distance) between input events and output events. This model is referred to herein as Continuous Time Noisy Or (CT-NOR).

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

In many applications and situations, a general mechanism may be useful for discovering dependencies between events from information gathered through passive observation mechanisms (e.g., logs and passive monitors) such as the time between the events, and some additional information pertaining the types of the events. Such an event may be a malicious attack on a networked enterprise, or the coordination between spam, phishing and malware installation in computers, for example. Another example of such an event is the automated discovery of the dependencies between hosts, protocols, and network services in an enterprise network.

Figure 1:
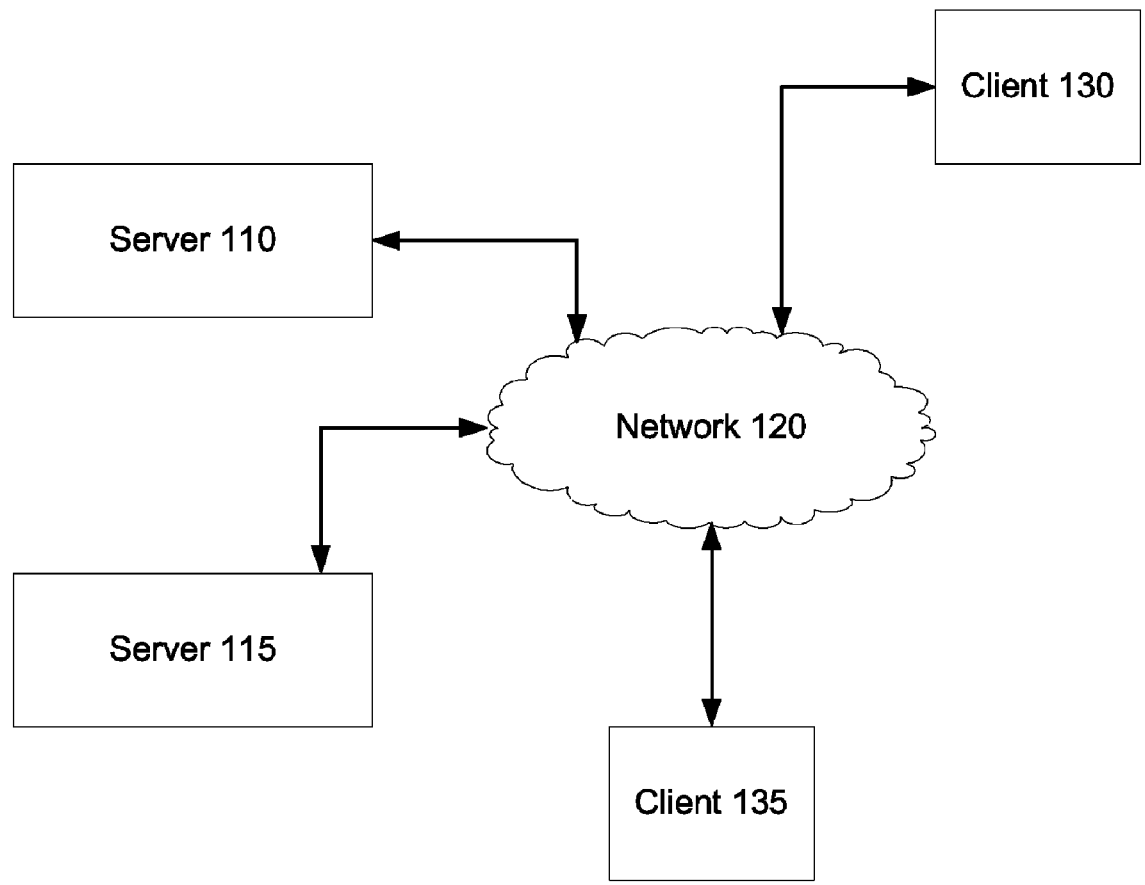
FIG. 1 is a block diagram of a computer network.

FIG. 1 is a block diagram of a computer network 100 that can be used to determine dependencies as described herein. A computer network is an interconnection of a group of computers. A host is a node on a network that is a computer. Computer networks may be classified according to the functional relationships which exist between the elements of the network, such as clients and servers.

A plurality of server computers (referred to as servers) 110, 115 are connected to each other by a communications network 120, such as a local area network (LAN) or wide area network (WAN) for example. A server is an application or device that performs services for connected clients as part of a client-server architecture. A server may be defined as a multi-user computer that provides a service (e.g., database access, file transfer, remote access) or resources (e.g., file space) over a network connection.

A plurality of client computers (referred to as clients) 130, 135 may also be connected to the network 120. A client is an application or system that accesses a remote service on another computer system (e.g., a server) by way of a network. Each instance of the client software can send data requests to one or more connected servers. In turn, the servers can accept these requests, process them, and return the requested information to the client. In this manner, computers may share files and resources.

Although only two servers 110, 115 are shown, any number of servers may be connected to the network 120 and to each other. Similarly, although only two clients 130, 135 are shown, any number of clients may be connected to the network 120. An example computer which may act as a server or client is described with respect to FIG. 6.

The nature of dependencies in computer networks can vary greatly. A host can assume the roles of both server and client for different instances of the same service. Each service may be provided by many servers, or a single server may provide many services, for example. Additionally, a client might invoke a single service variously on different servers. A computer may unwittingly have a transitive dependence upon other computers. These relationships are volatile, and may change as applications adapt to runtime conditions such as machine load variations or link failure.

In an implementation, dependencies between events pertaining to channels or services may be determined from passive observation of their timing characteristics. For example, dependencies between different services (e.g., hypertext transfer protocol (HTTP), lightweight directory access protocol (LDAP), server message block protocol (SMB), etc.) in a client or server may be determined from the observation of the times of the incoming and outgoing of the packets constituting those services. The network may also be monitored, and abnormalities may be diagnosed.

The techniques described herein can be used to discover causality in any setting having typed events in which timing information may be obtained. For example, the techniques described herein may be used to reconstruct attack sequences and dependencies.

Figure 2:
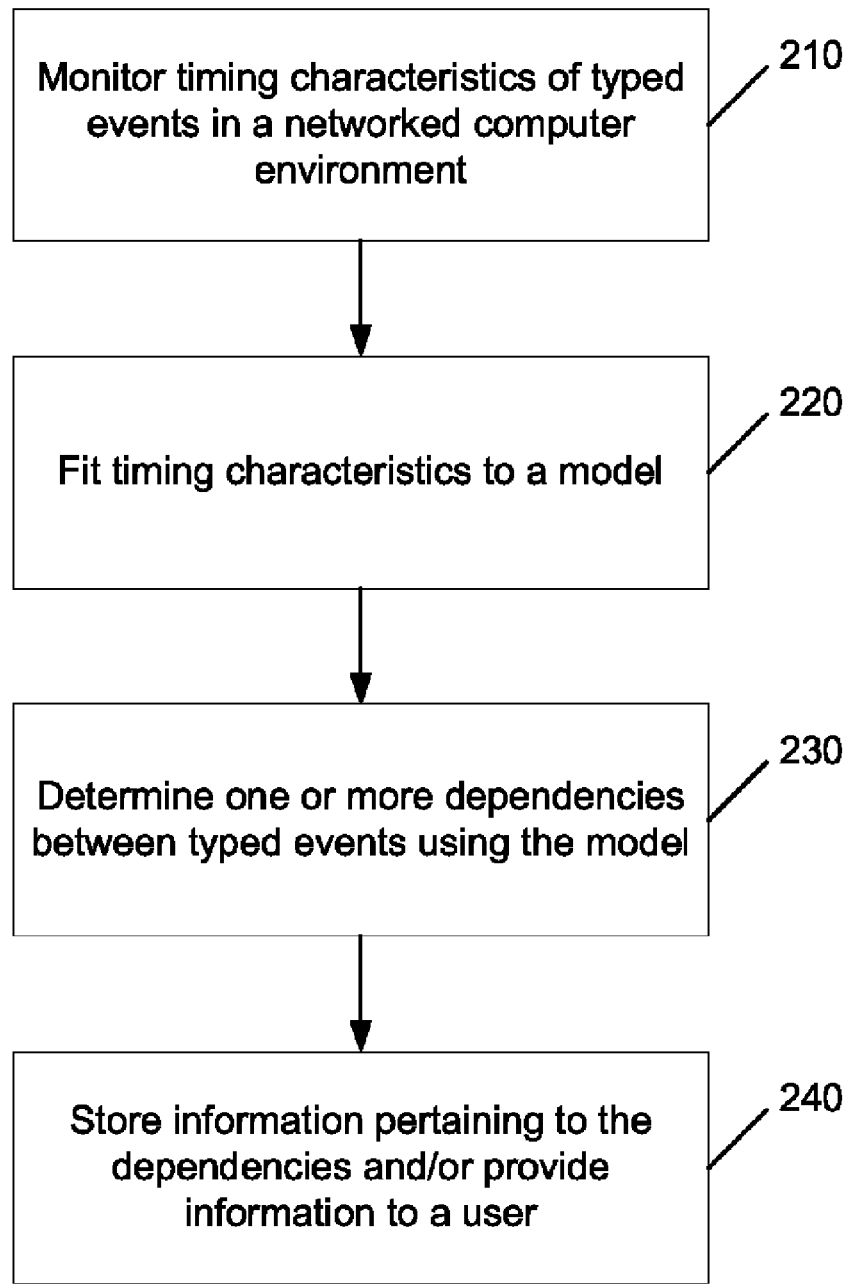
FIG. 2 is an operational flow of an implementation of a method of determining dependencies between events in a networked computing environment.

FIG. 2 is an operational flow of an implementation of a method 200 of determining dependencies between events in a networked computing environment. At operation 210, timing characteristics of typed events are monitored in computers within the computer network. Thus, communication packets between computers are passively observed. The dependencies between the computers may be inferred, along with what protocols are being used and what the protocols depend on. Timing may be used to infer what computer depends on which computer and protocol. A determination may be made of which input event causes which output event, based on timing.

The timing characteristics are fit to a model at operation 220. The model may be a probabilistic model. Additionally, the model may use a non-homogeneous Poisson process. Parameters of the model may be fit automatically based on passive observation of data such as the timing data. Known techniques may be used to fit the parameters of a probabilistic model from observations about the times of the events of interest. Thus, prior knowledge about the inter-time behavior between the events may be incorporated into the model using time functional specifications. Inter-time may be defined as the time between two events. In this manner, assumptions about the functional form of the time structure may be encoded into the probabilistic model.

In an implementation, a probabilistic model is provided using a non-homogeneous Poisson process that underlies the causal relationships between events in a networked computer system. A Poisson process is a well known stochastic process which may be used for modeling random events in time that occur to a large extent independently of one another. Examples of such events include telephone calls arriving at a switchboard or webpage requests on a server. Modeling traffic with Poisson processes is well known. A non-homogeneous Poisson process is a Poisson process with a rate parameter that is a function of time. As described herein, the non-homogeneous Poisson process may be modified to incorporate an inter-time process. The inter-time behavior may be embedded into the non-homogeneous Poisson process.

At operation 230, the model may be used to determine one or more dependencies between typed events. It may be determined which typed events are dependent on other typed events. In an implementation, at least one behavior characteristic may be predetermined, and the behavior characteristic may be used to determine dependencies. At operation 240, information pertaining to the dependencies may be stored and/or provided to a user.

In an implementation, the model may discretize time and may be based on a noisy-or model. In an implementation, the noisy-or probabilistic model may be approximated to encode the relationship about events using the non-homogeneous Poisson model. Such a per-host probabilistic model may capture the local interactions between different channels, services, and protocols, and is referred to herein as Continuous Time Noisy-OR (CT-NOR). The CT-NOR model may contain or automatically learn a list of the dependencies between output packets and input packets of different channels or services, and may be generated by means of a dependency test.

In an implementation, the relationship between events may depend on a function of the time between the events. An expected structure of a timing characteristic may be predetermined for use in determining dependencies. The parameters of the function may be fitted automatically.

A service associated with a channel may be identified using standard fields in packet headers and a correlation test may be used to determine interdependency between channels using packet timestamps. To determine dependent channels, a probabilistic model such as CT-NOR may be used to represent the inherent uncertainty and statistical tests to estimate the confidence in the inferences. CT-NOR is an extension of the well known noisy-or model. CT-NOR takes into account continuous time, the fact that activity in channels is relatively rare, and incorporates functions representing the expected timing relations between input and output. Thus, CT-NOR is based on the noisy-or model for representing causality under uncertain conditions. CT-NOR models events in continuous time, models the fact that there are relatively long periods of inactivity, and incorporates explicit functions of time, modeling the time delays between inputs and outputs.

In an implementation, CT-NOR considers a single output channel on a given host, and simultaneously analyzes this host's input channels to determine which channel or channels best help to explain the output packets. CT-NOR assumes there is a fixed but unknown delay function f(t), specifying the probability distribution of the delay between an input and the output or outputs it causes. For example, if f(t) is the uniform distribution $U_W(t)$ on the window [0,W], then the delay between an input packet and the resulting output(s) is equally likely to be any quantity in [0,W]. This is how a co-occurrence test models the delay between input and output. CT-NOR further assumes that the inputs from channel j produce, on average, some fixed but unknown number $p^j$ of output packets. The resulting model is a non-homogeneous Poisson process: if the kth input packet in channel j occurs at time $t_k^j$ the density of output packets generated by this input is given by $$p_k^j(t) = p^j f(t - t_k^j)$$

Two example models for the delay function f are (1) $f_G$ is a mixture of the uniform "spike" distribution $U_W$ and a Gaussian distribution $G_{\mu,\sigma}$ with mean $\mu$ and standard deviation $\sigma$; and (2) $f_E$ is a mixture of the uniform and the exponential distribution $E_\lambda$ with parameter $\lambda$. The Gaussian delay distribution extends the intuitions of co-occurrence within a window to also capture dependencies that can be relatively far away in time (such as with a printer where the length of time between the initial print job being spooled to the server and from the server to the physical printer may be several seconds). The exponential distribution captures the intuition that the possibility of dependence decays as the packets are further away in time. Example equations for these functions are:

$$f_G(t) = \alpha U_W(t) + (1-\alpha) G_{\mu,\sigma}(t)$$

$$f_E(t) = \alpha U_W(t) + (1-\alpha) E_\lambda(t)$$

The CT-NOR model simultaneously estimates $p^j$ and the delay function parameters ($\alpha$, W, $\mu$, $\sigma$ or $\alpha$, W, $\lambda$) in the above equations. This may be performed by the standard statistical technique of maximum likelihood estimation, and results in estimated parameters and the corresponding likelihood values. The likelihood value is the probability that a given model (complete with instantiated parameter values) will generate the specific data (input/output packets) observed. Similarly, by comparing likelihood values, the delay function which best fits the data may be chosen.

Note that in CT-NOR if the delay function parameters are known, the probability that each input caused each output could be determined, and hence the $p^j$ values above; whereas if the $p^j$ were known, the delay function parameters may be estimated. CT-NOR may solve this problem by employing an iterative algorithm similar to expectation maximization, an algorithm well known in statistics and machine learning.

In an implementation, dependencies may be determined using hypothesis testing on the model. To transform the CT-NOR probabilistic model into a test, a decision procedure may be used for determining whether an output channel is dependent on an input channel. A hypothesis testing approach from classical statistics may be used. To decide whether output channel B is dependent on input channel A, the likelihood of a CT-NOR model of output channel B is compared to one in which the input channel A is removed. The null hypothesis, $H_0$, is that the two have the same power in explaining the output packets. If $H_0$ may be rejected, then the channels are labeled as dependent, since the absence of the input channel A renders the second model less powerful in explaining the output packets observed in output channel B. Twice the difference in the log-likelihood in these two models behaves as a $\chi^2$ distribution with one degree of freedom (the missing channel). From the resulting $\chi^2$-value, as in any standard statistical test, one may obtain a p-value which gives the probability that a more extreme result would have occurred if the null hypothesis were true. To determine whether two channels are dependent, this p-value may be compared to a threshold that may be based on the confidence desired for the particular task.

A channel at a given host is a unidirectional flow of network packets sent or received by that host, identified by a direction (in or out), the remote peer, and a service. In an implementation, a service could be a protocol, application, or network service, which may be determined from the well known TCP/UDP port number or other information in the packet header. It should be noted that in the TCP and UDP protocols used in computer networking, a port is a special number present in the header of a data packet. Ports are typically used to map data to a particular process running on a computer. Table 1 shows examples of services, along with their directions, peers, and descriptions.

TABLE 1

| Direction | Service | Peer | Description |
|---|---|---|---|
| Out | HTTP | Web Server 1 | HTTP requests |
| Out | DNS | DNS Server | DNS requests |
| In | SMB | Laptop | Desktop file browsing |
| In | HTTP | Web Server 1 | HTTP responses |

In an implementation, dependency between channels, events, or services may be defined as tied to a period of time T of observation. For example, assume channel A is an input channel to a host, and channel B is an output channel from the host. In an implementation, channel B may be considered to be dependent on channel A in period T if packets in channel A caused packets in channel B during the period T.

A co-occurrence test for whether channels are dependent can be performed by counting the number of times a packet of the input channel is observed within a small time window prior to a packet on the output channel. The number of times such a co-occurrence might be expected to happen may be estimated using many known techniques. This number may be set as a threshold to determine whether channels are dependent or not.

Figure 3:
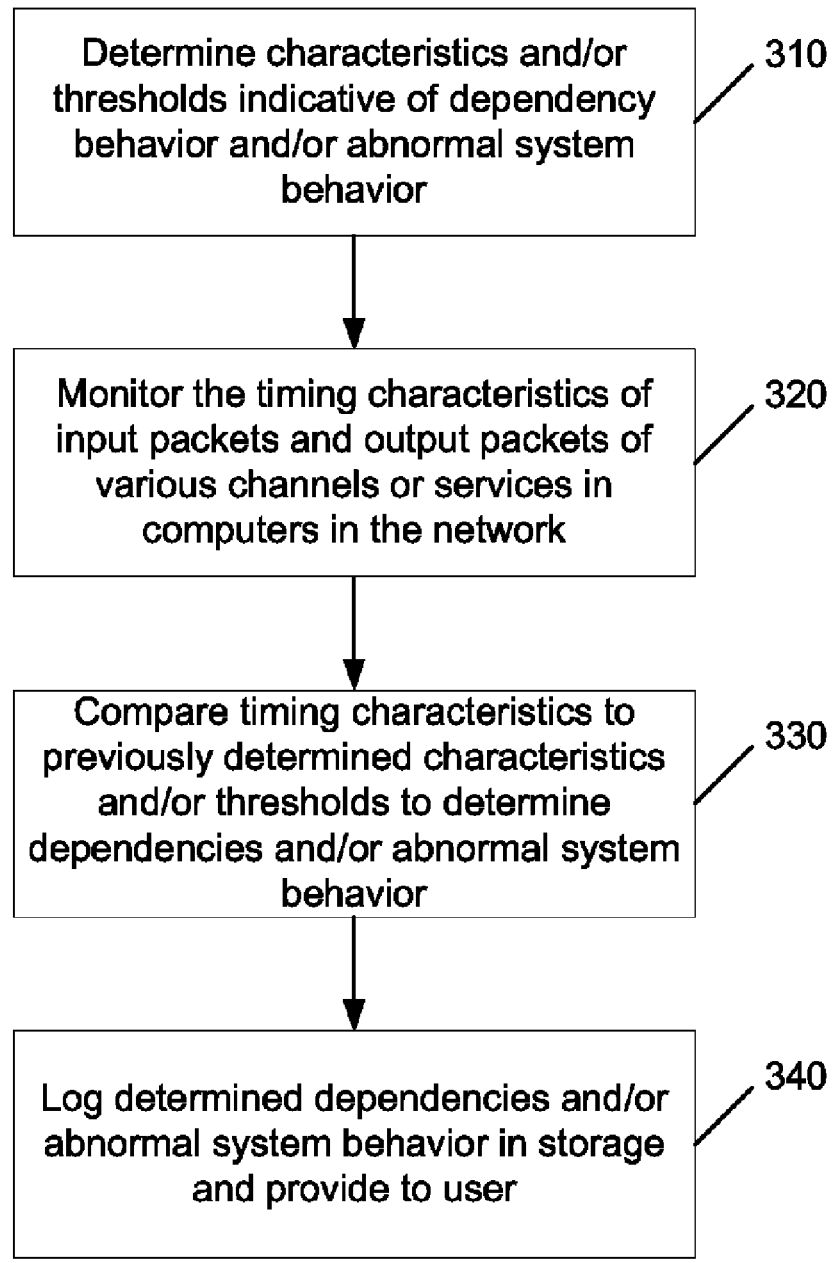
FIG. 3 is an operational flow of an implementation of a method of determining dependencies between events that are produced by channels or services.

FIG. 3 is an operational flow of an implementation of a method 300 of determining dependencies between events that are produced by channels or services. A set of predetermined characteristics and/or thresholds may be determined and stored in storage at operation 310. The characteristics and/or thresholds may be selected to be indicative of dependency behavior and/or abnormal system behavior.

At operation 320, the timing characteristics of the input packets and the output packets of various channels or services in computers in a network may be monitored. The timing characteristics may be compared to the predetermined characteristics and/or thresholds at operation 330, to determine dependencies and/or abnormal system behavior. For example, a threshold may indicate that two events are unrelated or not dependent on one another if the timing is greater than the threshold. The characteristics and/or thresholds may also be selected to be indicative of abnormal behavior, e.g., if the output packet is different than what was expected, if the times are slower than what was expected, etc. At operation 340, the determined dependencies or abnormal system behavior may be logged in storage and provided to a user, in an implementation.

Figure 4:
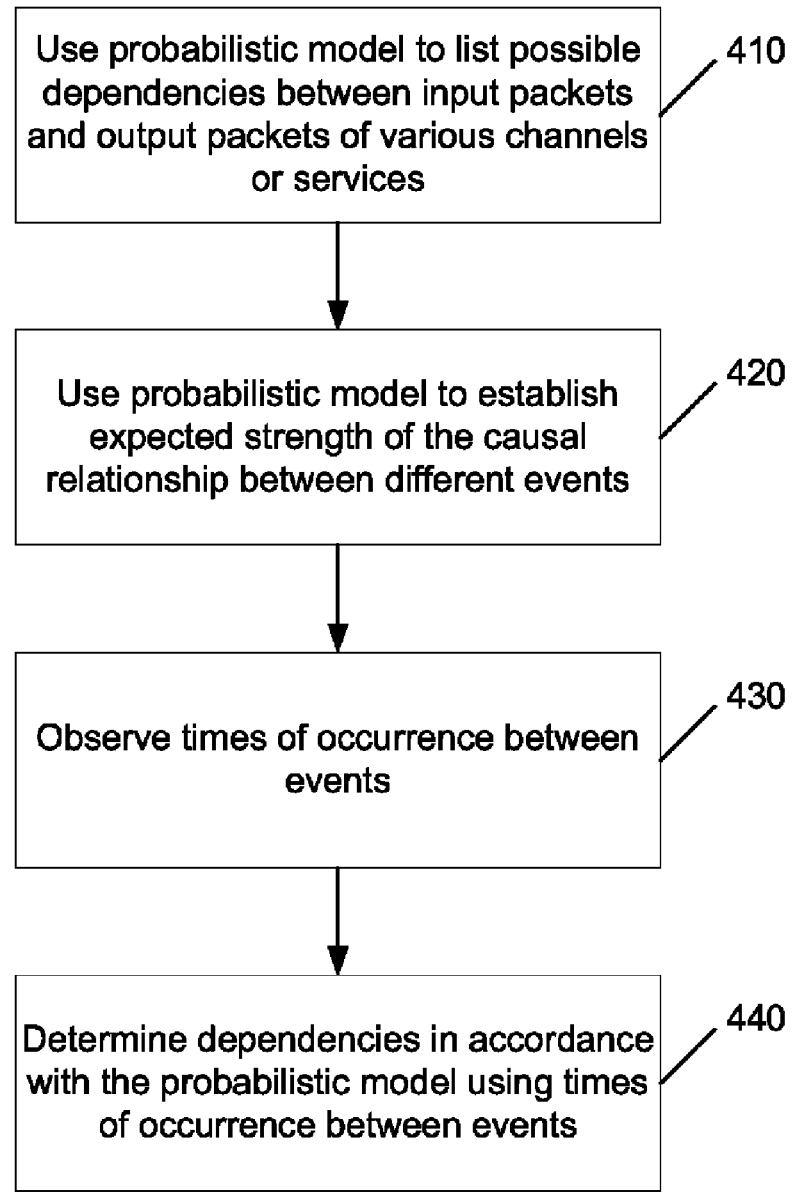
FIG. 4 is an operational flow of an implementation of a method of using a probabilistic model.

A probabilistic model may be used in the determination of dependencies. FIG. 4 is an operational flow of an implementation of a method 400 of using a probabilistic model. At operation 410, a probabilistic model may be used to list possible dependencies between input packets and output packets of various channels or services. The probabilistic model may be used to establish the expected strength of the causal relationship between the different events at operation 420. At operation 430, times of occurrence between events may be observed, and dependencies may be determined at operation 440 in accordance with the probabilistic model, as described further herein.

As described further herein, causal interactions between channels, services, and protocols in computers in a computer network may be determined by passive observation of their times of occurrence. This may allow users, operators, and developers to understand the interactions between the systems they come into direct contact with and those not within their immediate view that are part of the computer network.

Parameters in the model may be determined and adapted in real-time to fit the model used. The parameterization may be used to characterize the time relationship between input/output events. The parameters may be used for monitoring and diagnosing possible problems.

In an implementation, assume a set of "typed" input channels and a set of "typed" output channels. The term "typed" refers to the fact that there are distinguishable features that enable the separation of the channels into different sets. In the case of networked components, the type may be given by the service, e.g. HTTP, domain name system (DNS), etc., and the internet protocol (IP) address of the computer sending and/or receiving the packets. Each channel produces a sequence of events which is timestamped.

Given a set of "typed" input channels, a set of "typed" output channels, and a specified period of time T, a pairwise list may be obtained where channel B is said to be dependent on channel A, if and only if there is an event in channel A that caused an event in channel B during period of time T. For example, given as input data containing the input channels, their types, and the timestamped events, a pairwise list of dependent channels may be returned with a score on the confidence of that decision.

A probabilistic model of the relationship between the events in the channels is provided. CT-NOR may be considered to be a generative probabilistic model for each output channel B, denoted CT-NOR(B). As noted above, CT-NOR(B) may be a non-homogeneous Poisson process, and accepts a parameterized specification of the relationship dependent on time, between events in the input channels and the output channels. $F_\theta(t_A^i, t_B^j)$ may be used to denote this function.

In an implementation, dependencies may be determined using maximum a posteriori on an expected number of dependent events. The parameters of CT-NOR may be fit to the function F. This fitting can be based on maximum likelihood or on Bayesian-based procedures that compute maximum a posteriori distributions on the parameters.

A decision procedure may be implemented that outputs a decision on whether channel B is dependent on channel A for the channels of interest. The decision procedure may also include a score on the confidence of this decision. This decision procedure may be based on standard frequentist notions of hypothesis testing in which case the measure of confidence will be the p-value corresponding to the rejection of the null hypothesis, as is standard in statistics. It can also be based on Bayesian considerations, in which case a log-odds comparison or a posteriori distribution on the appropriate question may constitute the score on the decision.

CT-NOR(B) is a non-homogeneous Poisson process that comprises (1) $P_A$, which is the probability that an arbitrary event in input channel A generates an event in the output channel B; and (2) a time modulated function $F_\theta(t_A^i, t_B^j)$ which takes the timestamp $t_A^i$ of event i in input channel A, and $t_B^j$, the timestamp of event j in output channel B, and is parameterized by θ. Examples of this function include a uniform distribution within a window $t_w$ of each output event, an exponential distribution, and linear mixtures of the previous two (also combined). Other instantiations are contemplated depending on the domain knowledge available. The structure and parameterization of $F_\theta$ may have consequences on the fitting procedures.

The probability that event j in channel B is dependent on event i in channel A may be given by:

$$P_A^i(t_B^j) = \frac{P_A \times F_\theta(t_A^i, t_B^j)}{\sum_{i,C} P_C \times F_\theta(t_C^i, t_B^j)}$$

Let {B} denote the events on the output channels and, as given below, they are distributed according to the non-homogeneous Poisson process defined by the total sum of the probabilities of the packets in the input channels.

$$\{B\} \sim \sum_{i,C} PP(p_C^{(i)}) = PP\left(\sum_{i,C} p_C^{(i)}\right)$$

The fitting can be done using a using a maximum likelihood approach or a maximum a posteriori. Included here is the derivation of the likelihood function for a maximum likelihood approach. Let n be the number of outputs and $n^{(j)}$ be the number of inputs on channel j.

$$\lambda = \sum_{i,C} \int P_C^{(i)}(t)dt = \sum_{i,C} P_C$$

$$P(\{B\}) = P(n \text{ outputs}) \prod_l P(t_B^l)$$

$$= \frac{e^{-\lambda}\lambda^n}{(n)!} \prod_l \frac{\sum_{i,C} P_C^i(t_B^l)}{\lambda}$$

$$= \frac{e^{-\lambda}\lambda^n}{(n)!} \prod_l \frac{\sum_{i,C} P_C \times F_\theta(t_B^l, t_C^i)}{\lambda}$$

$$\log P(\{B\}) = -\lambda + \log(n!) + \sum_l \log \sum_{i,C} p_C \times F_\theta(t_B^l, t_C^i)$$

After the fitting of the model, a decision procedure may determine for each pair of typed channels B and A whether according to the model, events in B are dependent on events in A. One way of making this decision is to compare the model CT-NOR(B) to a model CT-NOR(B)' where the input channel A is absent. The comparison can be made in terms of the difference in log-likelihood function in which case the $\chi^2$ distribution can be used to reject the null hypothesis that the models are equal. If the hypothesis is rejected, it may be asserted that the models are not equal and that B is dependent on A as expressed above. The specific p-value for making the decision may be used as a score for confidence.

Figure 5:
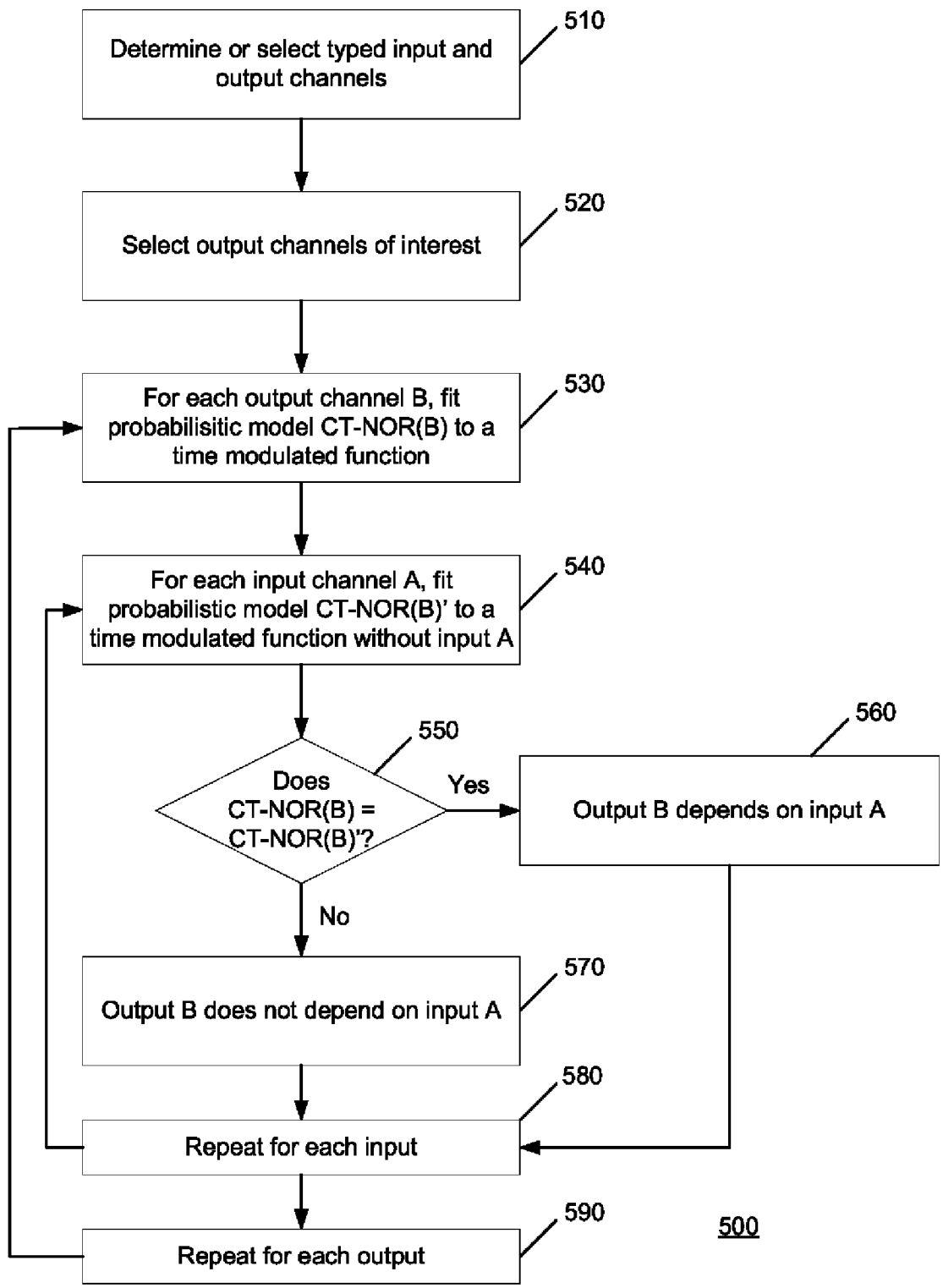
FIG. 5 is an operational flow of an implementation of a method of using a probabilistic model in determining dependencies between channels.

FIG. 5 is an operational flow of an implementation of a method 500 of using a probabilistic model in determining dependencies between channels. At operation 510, typed input and output channels are selected or otherwise determined. Output channels of interest may be selected by a user or network operator, for example, at operation 520.

For each output channel, denoted here as output channel B, CT-NOR(B) is fit to a time modulated function, at operation 530. For each input channel, denoted here as input channel A, CT-NOR(B)' is fit to a time modulated function without input channel A, at operation 540.

CT-NOR(B) may be compared to with CT-NOR(B)' to determine if they are different. If CT-NOR(B) is different from CT-NOR(B)' as determined at operation 550, it may be concluded at operation 560 that output channel B depends on input channel A. If CT-NOR(B) is not different from CT-NOR(B)' however, it may be concluded at operation 570 that output channel B does not depend on input channel A.

Processing may continue at operation 580 by returning to operation 540 for each input channel. After each input channel has been processed, processing may continue at operation 590 by returning to operation 530 for each output channel.

Thus, FIG. 5 depicts an implementation of a decision procedure that uses a probabilistic model to determine whether channels, and thus the events pertaining to them, are dependent on each other. It should be noted that this is not the only decision procedure that may be used, as other decision procedures may be based on the log-odds ratio of the specific model fitted and a more general model where parameters are marginalized, or on Bayesian considerations of computing the posterior probability of a model with the dependence in question, for example.

Figure 6:
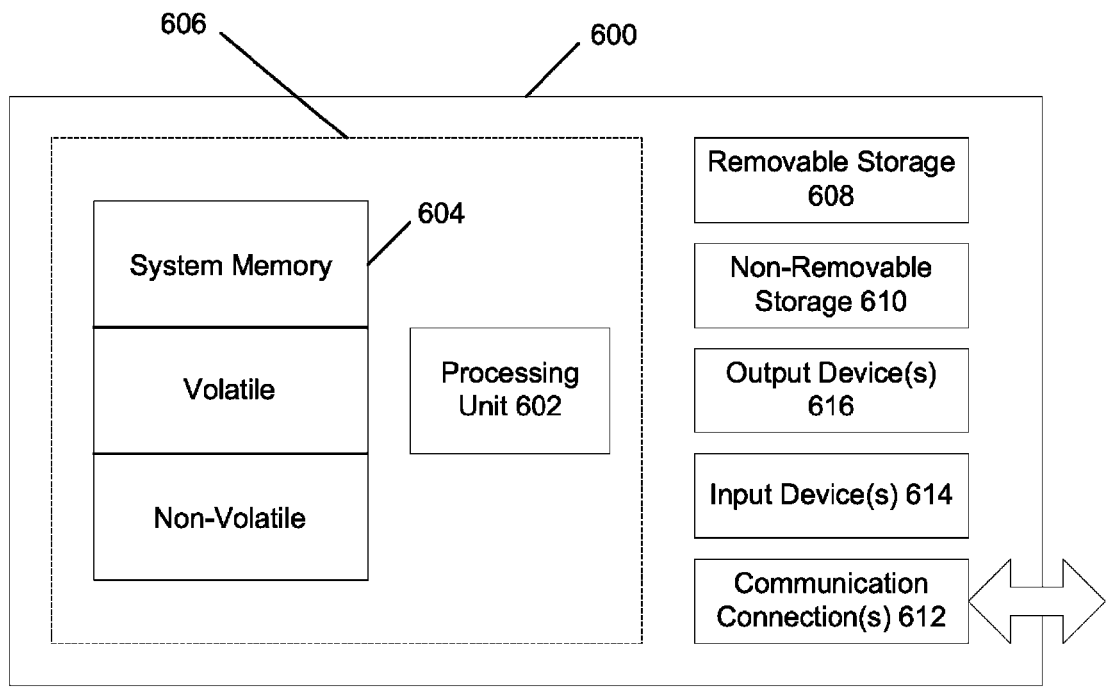
FIG. 6 shows an exemplary computing environment.

FIG. 6 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as RAM), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for determining dependencies between a plurality of typed events pertaining to channels or services in a networked computing environment comprising a plurality of computers comprising:
monitoring a plurality of timing characteristics comprising times of incoming and outgoing packets constituting a channel or a service for the plurality of typed events in the computers in the computer network;
fitting the timing characteristics of the plurality of timed events to a model;

using the model to determine which of the typed events are dependent on which other of the typed events based on the timing characteristics; and storing information pertaining to which of the typed events are dependent on which other of the typed events based on the timing characteristics.

2. The method of claim 1, wherein using the model to determine which of the typed events are dependent on which other of the typed events comprises predetermining at least one behavior characteristic based on at least one timing characteristic, and using the behavior characteristic to determine which of the typed events are dependent on which other of the typed events based on the timing characteristics.

3. The method of claim 1, wherein the model comprises a probabilistic model.

4. The method of claim 1, further comprising automatically fitting parameters of the model.

5. The method of claim 1, wherein the model uses a non-homogeneous Poisson process.

6. The method of claim 1, wherein the model discretizes time and is based on a CT-NOR model.

7. The method of claim 1, wherein the model comprises a function of time, and further comprising predetermining an expected structure of a timing characteristic for use in determining which of the typed events are dependent on which other of the typed events based on the timing characteristics.

8. The method of claim 7, further comprising fitting the parameters of the function automatically.

9. The method of claim 1, further comprising determining which of the typed events are dependent on which other of the typed events based on the timing characteristics using hypothesis testing on the model.

10. The method of claim 1, further comprising determining which of the typed events are dependent on which other of the typed events based on the timing characteristics using maximum a posteriori on an expected number of dependent events.

* * * * *